United States Patent [19]

Schlegel

[11] Patent Number: 4,624,786

[45] Date of Patent: Nov. 25, 1986

[54] APPARATUS FOR SEPARATING THE LIQUID PORTION FROM THE SOLID PORTION OF A CERAMIC SLIP

[76] Inventor: Dietrich Schlegel, Karlstrasse 30, 5100 Aachen, Fed. Rep. of Germany

[21] Appl. No.: 682,358

[22] PCT Filed: Mar. 23, 1984

[86] PCT No.: PCT/DE84/00068

§ 371 Date: Nov. 13, 1984

§ 102(e) Date: Nov. 13, 1984

[87] PCT Pub. No.: WO84/03660

PCT Pub. Date: Sep. 27, 1984

[30] Foreign Application Priority Data

Mar. 25, 1983 [DE] Fed. Rep. of Germany ....... 3311054

[51] Int. Cl.[4] ........ B01D 25/02

[52] U.S. Cl. ........ 210/414; 210/415

[58] Field of Search ........ 210/415, 414

[56] References Cited

U.S. PATENT DOCUMENTS

| | | | |
|---|---|---|---|
| 1,769,658 | 7/1930 | Veenhuyzen | 210/415 |
| 1,772,262 | 8/1930 | Naugle | 210/415 |
| 1,993,214 | 3/1935 | Hass | 210/415 |
| 2,565,947 | 8/1951 | Burghauser . | |
| 2,877,903 | 3/1959 | Veres | 210/510.1 |
| 3,016,345 | 1/1962 | Price | 210/510.1 |
| 3,093,579 | 6/1963 | Schmidt | 210/415 |
| 4,186,100 | 1/1980 | Mott | 210/510.1 |

FOREIGN PATENT DOCUMENTS

| | | | |
|---|---|---|---|
| 259812 | 11/1911 | Fed. Rep. of Germany . | |
| 1823332 | 6/1960 | Fed. Rep. of Germany . | |
| 1219444 | 11/1960 | Fed. Rep. of Germany . | |
| 1255084 | 11/1967 | Fed. Rep. of Germany . | |
| 1461417 | 4/1969 | Fed. Rep. of Germany . | |
| 1611150 | 2/1973 | Fed. Rep. of Germany . | |
| 363898 | 5/1906 | France . | |
| 634303 | 11/1927 | France . | |
| 975518 | 3/1951 | France . | |
| 987281 | 4/1951 | France . | |
| 1126882 | 7/1956 | France | 210/415 |
| 2310867 | 10/1976 | France . | |
| 46-16874 | 12/1967 | Japan | 210/415 |
| 110800 | 7/1925 | Switzerland . | |
| 2027605 | 2/1980 | United Kingdom | 210/415 |

*Primary Examiner*—Tim Miles

*Attorney, Agent, or Firm*—Price, Heneveld, Huizenga & Cooper

[57] ABSTRACT

An apparatus is described for separating the liquid portion from the solid portion of a liquid, finely disperse system, for example ceramic slip, having a worm (12) provided in a cylindrical housing (14), driven and surrounded by a filter aid (13), means for supplying slip at one end of the housing and a narrow solid discharge located on the worm axis at the other end of the housing, in which apparatus the filter aid (13) is inserted (at 21) so as to be secured against rotation in a massive casing forming the cylindrical housing (14), this casing being provided on its surface facing the filter aid (13) with a plurality of spaced peripheral grooves (15) which open out into a filtrate outflow (5), and the surface of the filter aid (13) facing the worm (12) being covered with an abrasion-proof, sufficiently wide-meshed screen (17), thereby creating a worm channel with a flat design, in which the slip is circulated so strongly by the relative movement between the worm and the worm cylinder that the liquid concentration is approximately constant across the cross-section of the worm channel and the liquid slip cannot filter through at the worm core up to the discharge mouthpiece of the press.

4 Claims, 8 Drawing Figures

Figure 1:
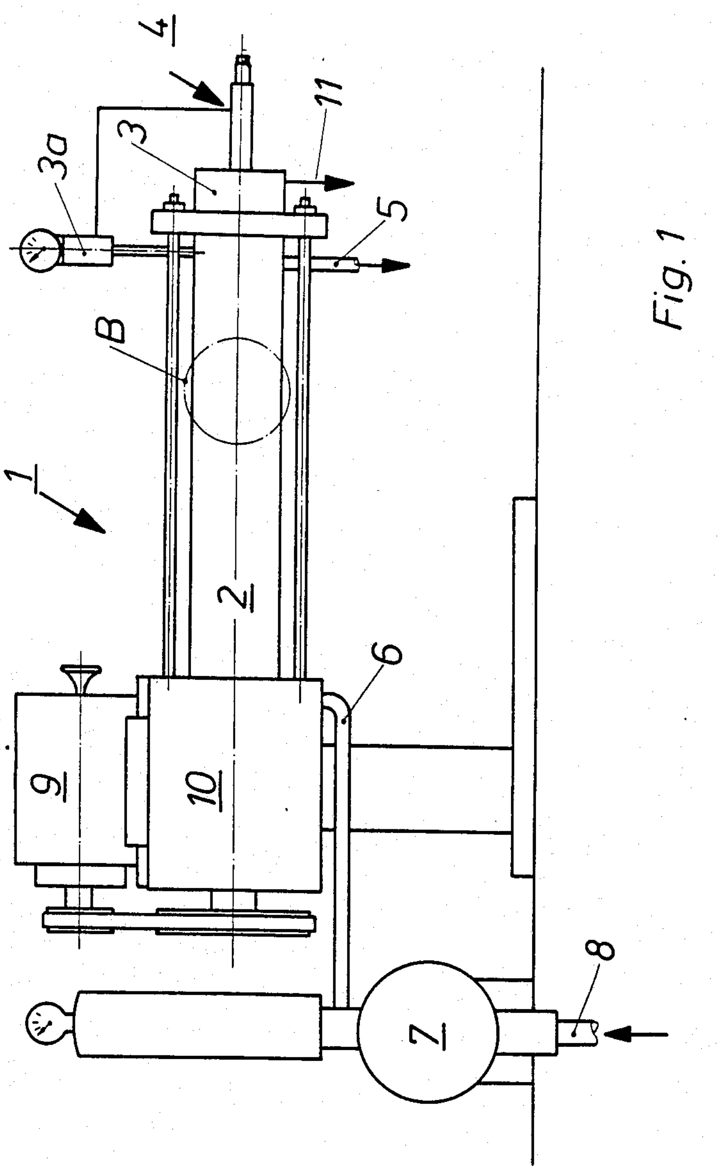

APPARATUS FOR SEPARATING THE LIQUID PORTION FROM THE SOLID PORTION OF A CERAMIC SLIP

The present invention relates to an apparatus for separating the liquid portion from the solid portion of a ceramic slip, having a worm provided in a cylindrical housing, driven and surrounded by a filter, and further having a means for supplying slip at one end of the housing and a narrow solid discharge located on the worm axis at the other end of the housing.

Such an apparatus is described, for example, in "International Chemical Engineering" (Vol. 18, No. 4) page 680 to 688 (Japan). In this apparatus, the filter cake which is deposited on the filter is carried along by a conveyor worm to the solid discharge. The filter cake slides along in the form of a blocking flow on the filter. This filter cake constitutes considerable flow resistance for the filtrate outflow. The filter in this apparatus comprises a perforated cylinder which is surrounded by a tube made of filter cloth. Filter cake accumulates additionally in the holes of the perforated cylinder, further increasing the flow resistance for the filtrate outflow. Thus, the filtrate outflow is relatively low in this apparatus. The filter tube is not supported from the outside, so that it is not capable of accommodating higher inside pressure.

Further apparatus of this or a similar design are described, for example, in German Auslegeschrift No. 12 55 084, German Auslegeschrift No. 12 19 444, German Offenlegungsschrift No. 14 61 417 and German Utility Model print No. 18 23 332.

The problem on which the invention is based is to improve such an apparatus in such a way that a filter cake is prevented from accumulating on the filter virtually completely, so that the filtrate outflow is increased. Further, the build-up of high pressure within the apparatus should be possible and thus the concentration of the solid concentrate also increased.

This problem is solved by the invention for the apparatus characterized at the outset in that the filter is inserted so as to be secured against rotation in a massive case forming the cylindrical housing, thereby forming a worm channel with a flat or smooth design, this case being provided on its surface facing the filter with a plurality of spaced peripheral grooves which open out into a filtrate outflow, and in that the surface of the filter facing the worm is covered by an abrasion-poof, sufficiently wide-meshed screen. This screen also improves, in particular, the conveying effect and the build-up of pressure in the worm channel.

Thus, what is essential to the inventive apparatus is a worm channel with a flat design in which the ceramic slip, or a similar matter, is circulated so greatly by the relative movement between the worm and the worm cylinder that the liquid concentration is approximately constant across the cross-section of the worm channel, at least in the last section of the mouthpiece, and the liquid slip thus cannot filter through at the root of the worm up to the mouthpiece.

It has been shown in experiments that an increase in the speed of the worm, and thus of the mixing processes in the worm channel, considerably increased the efficiency of the filter worm press.

Such an apparatus further has the advantage that it is possible to apply high feeding pressure for the slip and to build up high pressure due to the worm rotating inside the filter cylinder. The filter aid forming the casing of the worm channel is thereby additionally supported by the cylindrical housing consisting of a massive casing. The corresponding discharge grooves or channels for the filtrate may be provided in the casing without any difficulty and without any essential weakening of the supporting effect.

In a further embodiment of the invention, highly porous solids such as screen netting, for example, which additionally support the filter, may be provided in the peripheral grooves for the filtrate outflow, these solids offering only slight resistance to the filtrate flow.

If a fine-pore sintered metal cylinder is used as a filter, in a further embodiment of the invention, grooves preferably interrupted at intervals may be provided in the surface of this sintered metal cylinder facing the worm. These grooves take the place of the above-mentioned wide-meshed screen arranged on the surface of the filter, also improving the pressure build-up in the worm channel. They may either be formed directly in this sintered metal cylinder, or the sintered metal cylinder is divided up, in a development of the invention, into a plurality of successive cylinder sections, between which are provided cylindrical all-metal cylinder sections provided with grooves, the inside diameter of these sections being larger than or equal to the inside diameter of the sintered metal cylinder sections.

The housing cylinder preferably exhibits, in a further embodiment of the invention, a mouthpiece at the solid discharge, the aperture cross-section of this mouthpiece being regulated in accordance with the pressure generated at the end of the worm channel by the worm, in such a way that this pressure has a predetermined desired value, fluctuating only slightly.

This regulation of the mouthpiece provided at the solid discharge and thus the regulation of the wetness of the extruded plastic material in accordance with the pressure exerted on the worm cylinder by the extruded material at the mouthpiece end of the worm, are of considerable importance for the successful operation of the inventive apparatus. This pressure can be measured with a pressure absorber built into the worm cylinder. Experiments have shown a direct relationship between the wetness of the extruded plastic material and this pressure. If this pressure is kept constant in accordance with the inventive proposal, the wetness of the extruded material also remains constant. This pressure is easier to measure than the wetness and is, if only for this reason, suitable as a variable for controlling the aperture cross-section of the mouthpiece.

A further important reason for using the pressure as a control variable is the following. Since the mouthpiece is partly clogged every now and again and then rinsed free again after a while by the flow, the flow resistance of the mouthpiece, the pressure at the end of the worm channel and the wetness of the extruded material are constantly altered if the adjustment of the mouthpiece is not constantly corrected.

Since the abrasion on the filter can be very high, even if it is made of relatively abrasion-proof of sintered metal, it may be expedient to allow the formation on the filter of a filter cake which is static relative to the filter. For it has been shown that the pores on the surface may be closed to a large extent by the grinding effect in some cases, especially in the area of the mouthpiece, where the plastic material, which is already dehydrated to a large degree, slides across the filter under high pressure of 40 to 80 bar, for example. In a development of the invention, it is proposed to solve this problem which might occur, by using the abrasion-proof screen covering the surface of the filter to form a filter cake which is as thin as possible but static on the surface of the filter. The expedient sintered metal cylinder forming the filter should consist of a plurality of successive cylinder sections, between which cylindrical all-metal sections are arranged so as to be secured against rotation. On the inside of these latter sections, plates are provided which project beyond the surface of the filter. This creates an abrasion-proof, sufficiently wide-meshed screen directly on the surface of the filter, in whose meshes, which are static relative to the filter, the cake which is static relative to the filter can form. The thickness of the cake, i.e. the thickness of these protruding plates, must of course be as small as possible in order not to constitute an unnecessary obstacle to the filtrate outflow. In this embodiment, the filter is of subordinate importance. It only has the function of allowing for the first formation of a cake and supporting it. The fineness of the pores and the abrasive resistance of the filter no longer play an essential part since filtration is taken care of by the static filter cake layer. The filter may be made of sintered metal, porous synthetics or a simple tube of filter cloth or other material.

In a further embodiment of the invention, it is proposed that the cylindrical housing be constructed of a plurality of annular cylindrical sections, between each of which there is an intermediate ring having one side on the inside, i.e. on the side facing the worm, an axially protruding collar to which one end of a screen netting covering the inner surface of the filter aid is attached, its other end being attached to a protruding collar of an insert ring which is axially displaceable but secured against rotation and is provided in an annular recess in the adjacent intermediate ring. This filter netting has the same purpose as the above-described wide-meshed screen, i.e. to increase the conveying effect of the worm and to build up a static filter cake layer on the filter. In order to keep the thickness of the cake small, the size of the wire of the screen netting should be as small as possible. At the same time, the free cross-section of the screen netting should be as large as possible. A filter cloth wrapped around the screen netting from the outside is preferably used as a filter aid in this embodiment. Here too, of course, the filter is supported from the outside by the pressure-proof cylinder formed of the various annular cylinder sections, suitable channels for the filtrate outflow again being provided in the cylinder. It is expedient in this embodiment to provide porous solids, for example further screen netting, in the channels in order to provide better support for the filter.

The apparatus according to the invention exploits two phenomena which are characteristic of flow processes of suspensions and plastic dispersion of material: the wall-sliding effect and the circulating flow on the cross-sectional planes of worm channels. These phenomena are described, for example, in "Tonindustrie Zeiting" Vol. 99, no. 3, p. 62 to 65 (see in particular FIG. 7) and in "Berichte der Deutschen Keramischen Gesellschaft", Bd. 47, Book 12, p. 774–779. The suspension or the dispersely plastic medium slides on the walling of the worm channel, and thus also on the smooth fine-pored surface of the sintered metal cylinder, or on the thin filter cake layer which is static on the surface of the filter, and is constantly transported, due to this and the circulating flow in the cross-section of the worm channel, from the surface of the filter back into the worm channel and again to the filter. This circulating flow also occurs in the worm channel in the case of highly compact plastic materials at high pressure gradients. The back mixing of the upgrading suspension, or the upgrading dispersely plastic material, takes place so quickly that differences in concentration in the cross-section of the worm channel are only noticeable to a very small degree and static filter cake layers are thus prevented from forming except for the thin filter cake layer located on the filter.

The prior art includes not only the apparatus already described at the outset but also a rotary disk filter as in "Filtration und Separation" September/October 1977, p. 455 to 458. In the case of this rotary disk filter, the slip is also introduced under pressure into a space surrounded by a filter, the liquid portion pressed out through the filter and the solid portion retained in the space surrounded by the filter and, conveyed in the direction of flow of the slip and discharged from the latter at the end of the space. The retained solid portion which is deposited on the filter is not completely removed after being deposited, but remains in part on the filter because it is supposed to contribute to supporting the filtration process. However, webs are arranged on rotating disks in order to cause the filter cake to be removed in part.

In case high concentrations of solids occur in the apparatus as in this embodiment, the upgraded material will slide on the smooth surface of the filter not covered by a screen, whereby strong abrasion of the filter surface may occur at least in the case of abrasive, for example ceramic, materials. However, the conveying effect of the spirally arranged webs on the rotating disk is relatively small in this embodiment. Furthermore, pressure is constantly reduced during the transition from one chamber to the other, so that pressures and concentrations of solids as can be attained in a worm filter press are not to be expected.

An apparatus for so-called "dynamic filtration" has become known from "Escher Wyss Mitteilungen" 2/1978–1/1979, p. 21 to 23, as well. In this apparatus, a smooth-cased cylinder runs in a static cylinder arranged concentrically thereto, both being covered with a filter aid. At the boundary layers of the movement of the two cylinders in one another, dynamic forces form which lead to a whirling circulating flow and to continuous removal of the filter cake. Since the pressure is constantly reduced in the flow channel, it is not possible to attain high pressures, which alone guarantee a high concentration of the concentrate.

The Figures show:

FIG. 1 a side view of the apparatus

Figure 2:
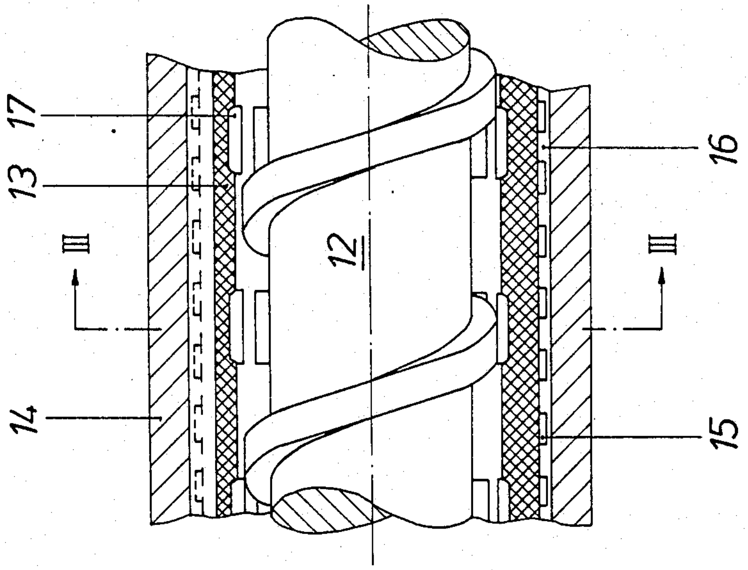

FIG. 2 a partial longitudinal section of the press cylinder in area B of FIG. 1

Figure 3:
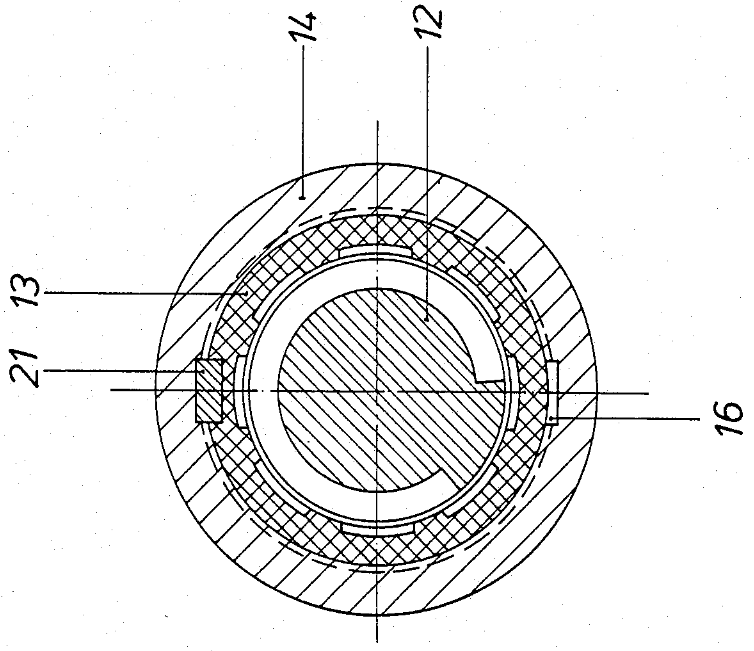

FIG. 3 a section along III—III of FIG. 2

Figure 5:
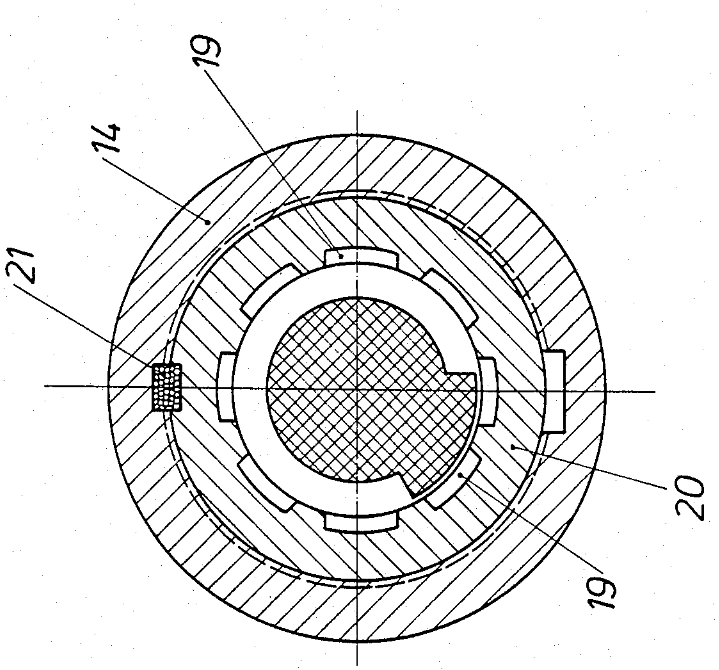
Figure 4:
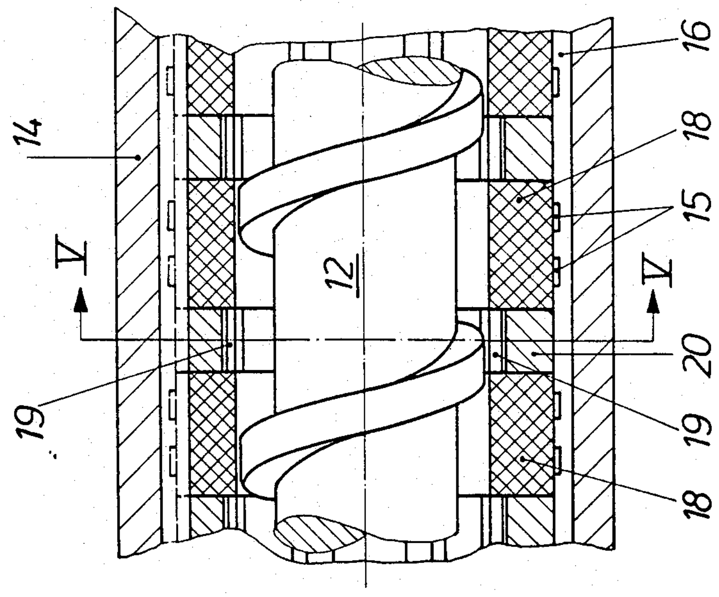

FIG. 4 a partial longitudinal section similar to that of FIG. 2, but of a slightly modified embodiment FIG. 5 a section along V—V of FIG. 4

Figure 6:
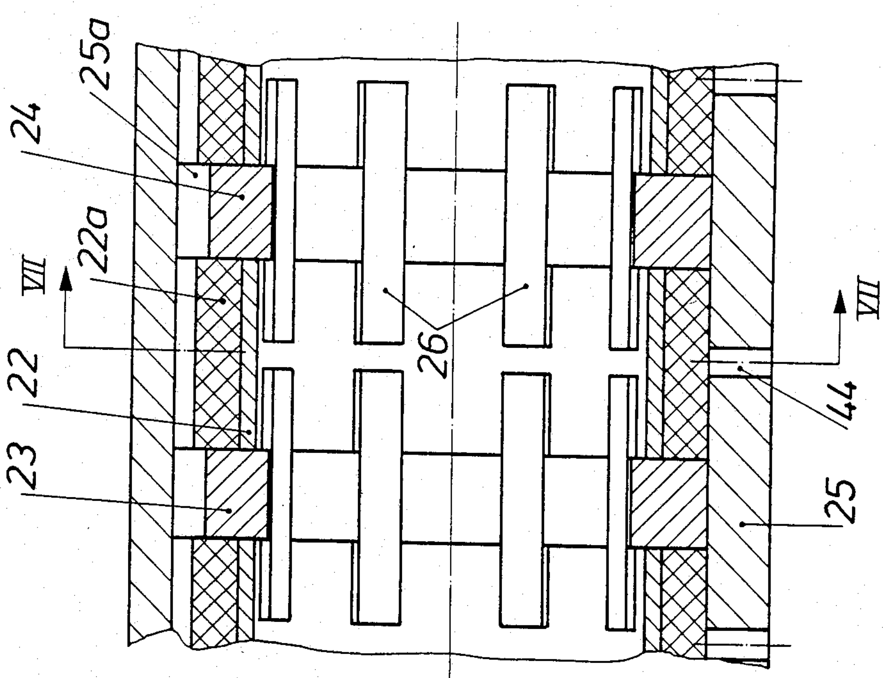
Figure 7:
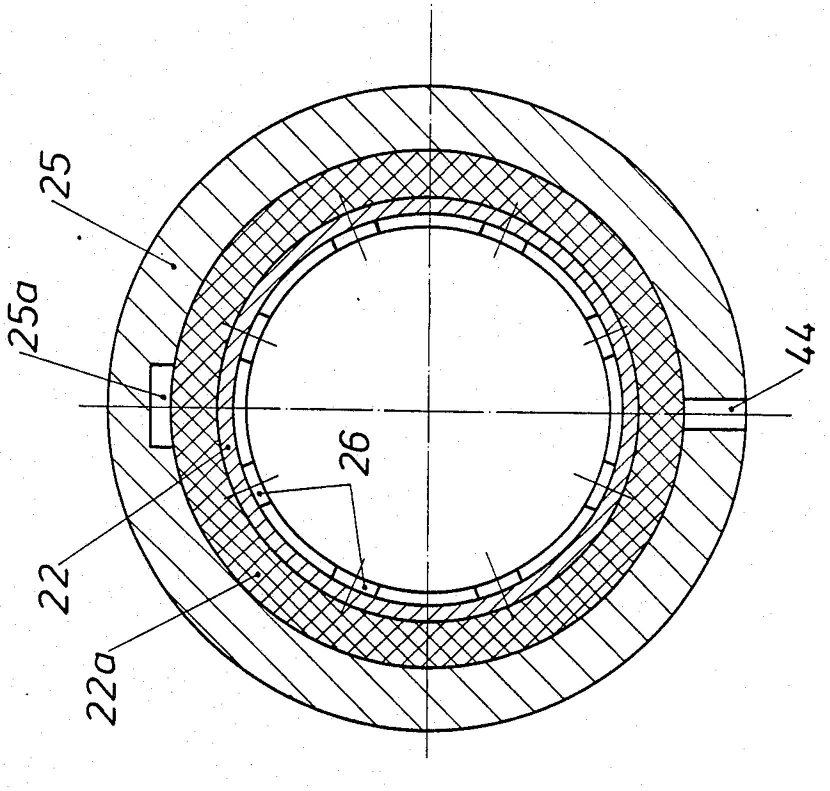

FIG. 6 a partial longitudinal section of a modified embodiment of a press cylinder FIG. 7 a section along the line VII—VII of FIG. 6

Figure 8:
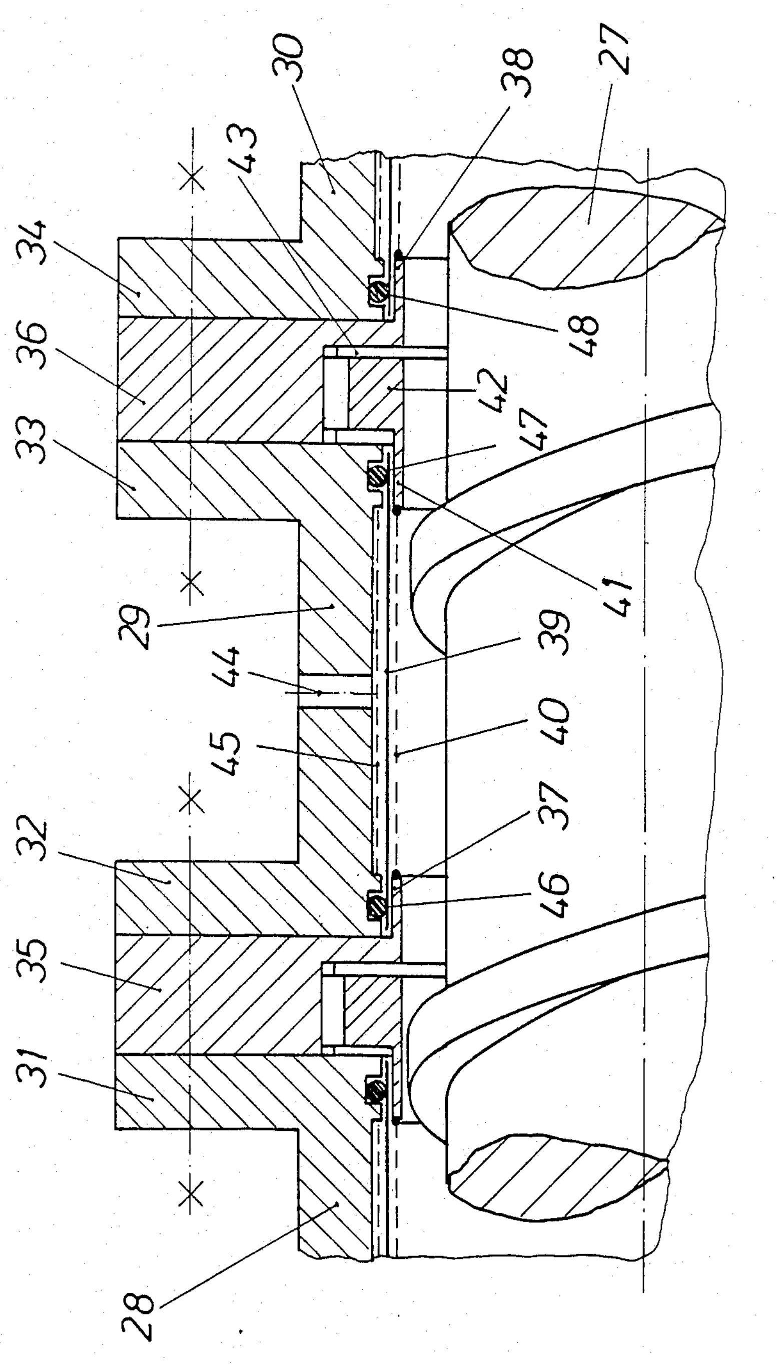

FIG. 8 a partial cutaway portion corresponding to the section as in FIG. 6 of a further modified embodiment.

In FIG. 1 the apparatus for separating the liquid portion from the solid portion of a finely dispersed liquid system, e.g. of a ceramic slip, is generally referred to as 1. It contains a filter cylinder 2 in a housing 3, at one end of which at 11 the solid discharge is provided. In portion 4 the adjusting device for the aperture cross-section of the solid discharge is provided. *3a* indicates a pressure transducer for measuring the final pressure in the worm channel. The liquid portion outflow is provided at 5. The slip is fed into filter cylinder 2 under pressure via pressure pipe 6 by a pump 7, preferably a diaphragm pump. Number 8 refers to the suction pipe of pump 7, via which the slip is sucked in by pump 7 from a supply (not shown). A controllable drive means for the worm arranged in the interior of filter cylinder 2, which is not visible here but will be described in more detail below, is indicated at 9. Number 10 refers to a bearing housing with means for feeding the slip to the worm.

In FIGS. 2 and 3 the worm can be recognized at 12, being surrounded by a fine-pored sintered metal cylinder 13 and driven, as already indicated in connection with FIG. 1, by controllable drive means 9. Sintered metal cylinder 13 is supported by a pressure-proof housing 14. In this housing 14, discharge grooves for the filtrate in the form of annular grooves 15 and longitudinal grooves 16 may be provided without difficulty and without essentially weakening the supporting effect. In sintered metal cylinder 13, grooves 17 provided on the surface facing worm 12 and preferably interrupted at intervals, improve the pressure build-up in the worm channel. These grooves 17 may either be formed directly in sintered metal cylinder 13, or the sintered metal cylinder consists, as shown in FIG. 4, of a plurality of successive cylinder sections 18. Between these cylinder sections 18, cylindrical all-metal cylinder sections 20 provided with grooves 19 are then inserted, their inside diameter being greater than, or equal to, the inside diameter of cylinder sections 18 made of sintered metal. At 21 a feather key is indicated, which holds sintered metal cylinder 13 or the succession of sintered metal sections 18 and all-metal sections 20 unrotatably in pressure-proof housing 14, which is preferably made of pressure-proof steel.

FIG. 6 indicates at 22 a filter ring which is held between two cylinder sections 23 and 24 and supported by a porous thrust ring *22a*, e.g. a screen netting, against pressure-proof housing 25. The annular cylinder sections 23 and 24 are secured against rotation in housing 25 by means of feather keys *25a*. On rings 23 and 24 there are plates 26 between which a filter cake can build up on the surface of the filter ring.

In the embodiment as in FIG. 8 one can see worm 27. The cylindrical housing consists here of a plurality of annular cylinder sections 28, 29 and 30, having flanges 31, 32, 33 and 34. Between each of these flanges there is an intermediate ring 35, 36 having on the inside, on one side, an axial protruding collar 37, 38 to which one end of a screen netting 40 covering the inside surface of filter aid 39 is attached, for example soddered. The other end of this screen netting 40 is attached to a protruding collar 41 of an insert ring 42 which is axially displaceable but secured against rotation and provided in an annular recess in the adjacent intermediate ring 36. Filter 39, for example a filter cloth, is also supported towards the outside by a highly porous thrust ring 45, which may be a screen netting, for example, and through which the filtrate flows towards filtrate outflow 44. One can also detect sealing rings 46, 47 and 48, which are provided in corresponding annular grooves in the cylinder sections.

I claim:

1. An apparatus for separating the liquid portion from the solid portion of a liquid, finely dispersed material, in particular a ceramic slip, said apparatus having an internal pressure resistant cylindrical housing, a driven worm mounted therein, means for supplying the slip at one end of the housing and a narrow solid discharge throat at the other end of the housing, said apparatus characterized in that a filter means is mounted within said housing and surrounds the worm, said housing supporting said filter means against radial pressure and anchor means securing said filter means to said cylindrical housing against rotation, said filter means having slip trapping means on its inner face for capturing and holding stationary a thin layer of the slip between it and the adjacent face of said worm thereby forming a smooth surface of reduced abrasive effect surrounding said worm, against which the worm can move the slip both axially and radially of the worm chamber with reduced resistance to axial movement, said layer being thin enough to permit liquid filtrate to pass through it, said filter means including a plurality of cylindrical sections, a ring element seated between each pair of adjacent sections and concentric therewith, said slip trapping means including plates secured to said ring elements and protruding radially inwardly beyond the inner faces of said cylindrical sections and axially over portions of the inner faces of said cylindrical sections for trapping the layer of slip, a plurality of axially spaced grooves communicating with said filter member for receiving filtrate separated from the slip, a filtrate discharge port, said grooves communicating with said port.

2. The apparatus described in claim 1 wherein said liquid permeable member is a cylindrical thrust ring seated between said slip trapping means and said housing and providing radial support for said slip trapping means.

3. An apparatus for separating the liquid portion from the solid portion of a liquid, finely dispersed material, in particular ceramic slip, said apparatus having an internal pressure resistant cylindrical housing, a driven worm mounted therein, means for supplying the slip at one end of the housing and a narrow solid discharge throat at the other end of the housing, said apparatus characterized in:

filter means mounted within said housing and surrounding the worm, said filter means including anchor means securing said filter means to said cylindrical housing against rotation, said filter means having a slip trapping means on its inner face for capturing and holding stationary a thin layer of the slip between it and the adjacent face of said worm thereby forming a smooth surface of reduced abrasive effect surrounding said worm, against which the worm can move the slip both axially and radially of the worm chamber with reduced resistance to axial movement, the layer being thin enough to permit liquid filtrate to pass through it, said filter means further having at least one rigid, porous, solids-retaining, liquid-permeable, radial thrust resistant cylinder at least a portion of which is located radially outwardly beyond said slip trapping means, said housing supporting said filter means against radial pressure generated by said worm, said slip trapping means being circumferential grooves recessed into the inner face of said cylinder;

a plurality of liquid collecting spaced grooves at the radial outer face of said cylinder and communicating with said slip trapping means through said cylinder for receiving liquid filtrate separated from the slip; and a filtrate discharge port communicating with said grooves.

4. An apparatus for separating the liquid portion from the solid portion of a liquid, finely dispersed material, in particular ceramic slip, said apparatus having an internal pressure resistant cylindrical housing, a driven worm mounted therein, means for supplying the slip at one end of the housing and a narrow solid discharge throat at the other end of the housing, said apparatus characterized in:

filter means mounted within said housing and surrounding the worm, said filter means including anchor means securing said filter means to said cylindrical housing against rotation, said filter means having a slip trapping means on its inner face for capturing and holding stationary a thin layer of the slip between it and the adjacent face of said worm thereby forming a smooth surface of reduced abrasive effect surrounding said worm, against which the worm can move the slip both axially and radially of the worm chamber with reduced resistance to axial movement, the layer being thin enough to permit liquid filtrate to pass through it, said filter means further having a plurality of cylindrical, rigid, porous, solids-retaining, liquid-permeable sections at least a portion of which is located radially outwardly beyond said slip trapping means, said filter means further having a ring element seated between each of said sections and concentric therewith, said ring element having an inner diameter greater than the inner diameter of said cylinder sections thereby forming circumferential grooves between said cylindrical sections, said slip trapping means being said grooves, said housing supporting said filter means against radial pressure generated by said worm;

a plurality of liquid collecting spaced grooves at the radial outer face of said liquid permeable member and communicating with said slip trapping means through said permeable member for receiving liquid filtrate separated from the slip; and a filtrate discharge port communicating with said grooves.

* * * * *